US012698842B2

(12) United States Patent
Suzuki

(10) Patent No.: US 12,698,842 B2
(45) Date of Patent: Aug. 4, 2026

(54) VALVE STRUCTURE FOR HYDROGEN TANK

(71) Applicant: TOYOTA JIDOSHA KABUSHIKI KAISHA, Toyota (JP)

(72) Inventor: Yuto Suzuki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/981,669

(22) Filed: Dec. 16, 2024

(65) Prior Publication Data

US 2025/0277535 A1      Sep. 4, 2025

(30) Foreign Application Priority Data

Feb. 29, 2024      (JP) ................................. 2024-030277

(51) Int. Cl.
*F16K 17/38*          (2006.01)
*F17C 13/04*          (2006.01)

(52) U.S. Cl.
CPC ............ *F16K 17/383* (2013.01); *F17C 13/04* (2013.01); *F17C 2205/0317* (2013.01); *F17C 2205/0332* (2013.01); *F17C 2205/0385* (2013.01)

(58) Field of Classification Search
CPC ...... F17C 2205/0317; F17C 2205/0332; F17C 2205/0385; F16K 17/383
See application file for complete search history.

(56) References Cited

U.S. PATENT DOCUMENTS

| | | | | |
|---|---|---|---|---|
| 5,309,945 | A | * | 5/1994 | Sakai ...................... F17C 13/04 137/861 |
| 6,691,729 | B2 | * | 2/2004 | Takeda .................... F17C 13/04 62/50.7 |
| 6,708,718 | B2 | * | 3/2004 | Yamada ................ F17C 13/045 137/263 |
| 7,111,818 | B2 | * | 9/2006 | Takeda .................. F16K 17/383 137/75 |
| 8,141,574 | B2 | * | 3/2012 | Weatherly ............. F16K 17/383 137/72 |
| 8,550,105 | B2 | * | 10/2013 | Ishitoya .................. F16K 1/307 137/72 |
| 11,508,974 | B2 | * | 11/2022 | Kataoka ................ F17C 13/084 |

FOREIGN PATENT DOCUMENTS

| | | |
|---|---|---|
| CN | 218063555 U | 12/2022 |
| JP | 2002-168399 A | 6/2002 |
| JP | 2022-088966 A | 6/2022 |

* cited by examiner

*Primary Examiner* — Kevin F Murphy
(74) *Attorney, Agent, or Firm* — SoraIP, Inc.

(57)          ABSTRACT

The valve structure of the hydrogen tank includes a valve body mounted on a base of the hydrogen tank and having a first communication passage communicating with the inside of the hydrogen tank, and a fusible plug valve mounted on the valve body via a spacer. The spacer has a second communication passage communicating with the first communication passage and a discharge port provided on an outer wall of the spacer. The second communication passage and the discharge port are shut off by the valve body when the fusible plug valve is closed, and communicate with each other when the fusible plug valve is opened. The discharge port is provided on an outer wall of the spacer other than an outer wall that contacts the valve body and an outer wall that contacts the fusible plug valve.

5 Claims, 6 Drawing Sheets

VALVE STRUCTURE FOR HYDROGEN TANK

CROSS-REFERENCE TO RELATED APPLICATION

This application claims priority to Japanese Patent Application No. 2024-030277 filed on Feb. 29, 2024, incorporated herein by reference in its entirety.

BACKGROUND

1. Technical Field

The present disclosure relates to a valve structure for a hydrogen tank.

2. Description of Related Art

Japanese Unexamined Patent Application Publication No. 2022-88966 (JP 2022-88966 A) discloses a fuel cell electric vehicle including a hydrogen tank and a hydrogen pipe connecting the hydrogen tank and a fuel cell and provided with a discharge port that discharges hydrogen to the outside. In this fuel cell electric vehicle, the hydrogen pipe is provided with a heat-actuated overpressure suppression device and a pressure-actuated overpressure suppression device. With this configuration, hydrogen flowing through the hydrogen pipe is discharged from the discharge port when the internal temperature of the hydrogen tank is equal to or higher than a predetermined temperature or the internal pressure of the hydrogen tank is equal to or higher than a predetermined pressure, maintaining the safety of the hydrogen tank.

SUMMARY

In the fuel cell electric vehicle described in JP 2022-88966 A, however, it is assumed that a hydrogen pipe is used, complicating the valve structure. Additionally, the discharge port is provided in the hydrogen pipe connecting the hydrogen tank and the fuel cell, and therefore there is a problem that the position of the discharge port is not freely changeable.

The present disclosure has been made to address such technical issues, and an object thereof is to provide a valve structure for a hydrogen tank capable of changing the position of a discharge port while suppressing the complication of the structure.

An aspect of the present disclosure provides a valve structure for a hydrogen tank, including:

a valve body mounted to a metal fitting of the hydrogen tank and having a first communication passage communicating with an interior of the hydrogen tank; and a fusible plug valve attached to the valve body via a spacer, in which:

the spacer has a second communication passage communicating with the first communication passage, and a discharge port provided in an outer wall of the spacer;

the second communication passage and the discharge port are blocked by a valve element of the fusible plug valve when the fusible plug valve is closed, and communicate with each other when the fusible plug valve is opened; and the discharge port is provided in a part of the outer wall of the spacer other than the outer wall in contact with the valve body and other than the outer wall in contact with the fusible plug valve.

In the valve structure for a hydrogen tank according to the present disclosure, the fusible plug valve is attached to the valve body via a spacer, simplifying the structure compared to the conventional structure having a hydrogen pipe. In addition, the fusible plug valve is not directly attached to the valve body, and is attached to the valve body via the spacer, enabling the discharge port for a hydrogen gas to be provided in the spacer rather than being provided in the valve body. Thus, the number of locations where the discharge port can be arranged increases. Additionally, the discharge port is provided in a part of the outer wall of the spacer other than the outer wall in contact with the valve body and other than the outer wall in contact with the fusible plug valve. Therefore, the position of the discharge port is freely changeable in a part of the outer wall of the spacer other than the outer wall in contact with the valve body and other than the outer wall in contact with the fusible plug valve. Thus, it is possible to adjust the position of the discharge port so as not to interfere with peripheral components according to the arrangement relationship of the peripheral components of the valve structure. As a result, it is possible to implement a valve structure for a hydrogen tank capable of changing the position of a discharge port while suppressing the complication of the structure.

In the valve structure according to the present disclosure, the fusible plug valve may include a pressing member that presses the valve element in a valve closing direction, and a fusible member juxtaposed to the pressing member; and the discharge port may be disposed on a side opposite to the fusible member when viewed in a direction orthogonal to a direction in which the pressing member and the fusible member are juxtaposed.

With this configuration, it is possible to suppress the influence of hydrogen discharge on the fusible plug valve.

According to the present disclosure, it is possible to implement a valve structure for a hydrogen tank capable of changing the position of a discharge port while suppressing the complication of the structure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
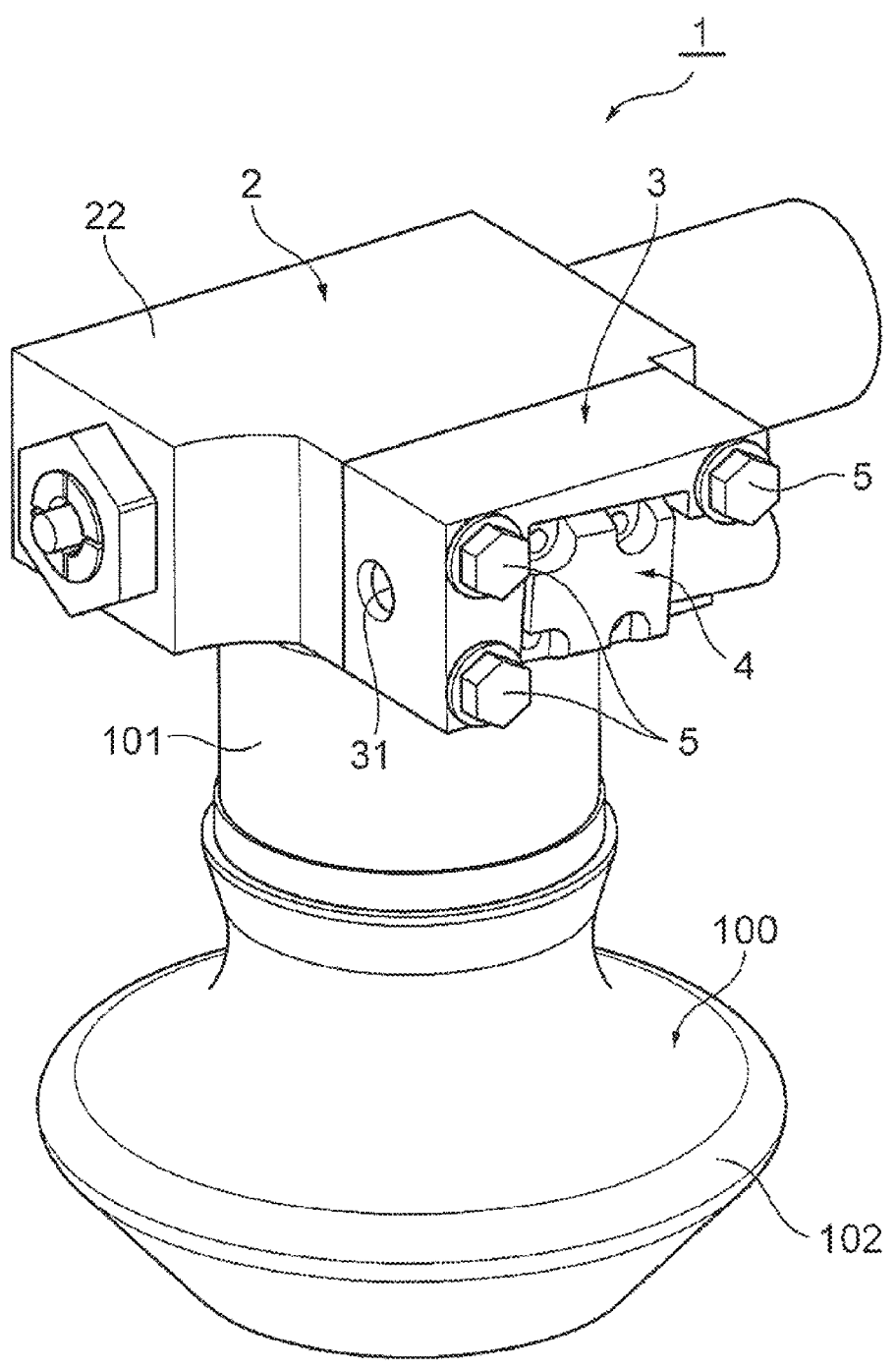
FIG. 1 is a perspective view illustrating a valve structure of a hydrogen tank according to an embodiment.

Hereinafter, an embodiment of a valve structure of a hydrogen tank according to the present disclosure will be described with reference to the drawings. In the description of the drawings, the same elements are denoted by the same reference numerals, and redundant description thereof will be omitted. It should also be noted that the valve structure of the hydrogen tank is not meant to include a base as well, although the base of the hydrogen tank is also depicted in the drawings in order to make the valve structure of the hydrogen tank easier to understand.

Figure 2:
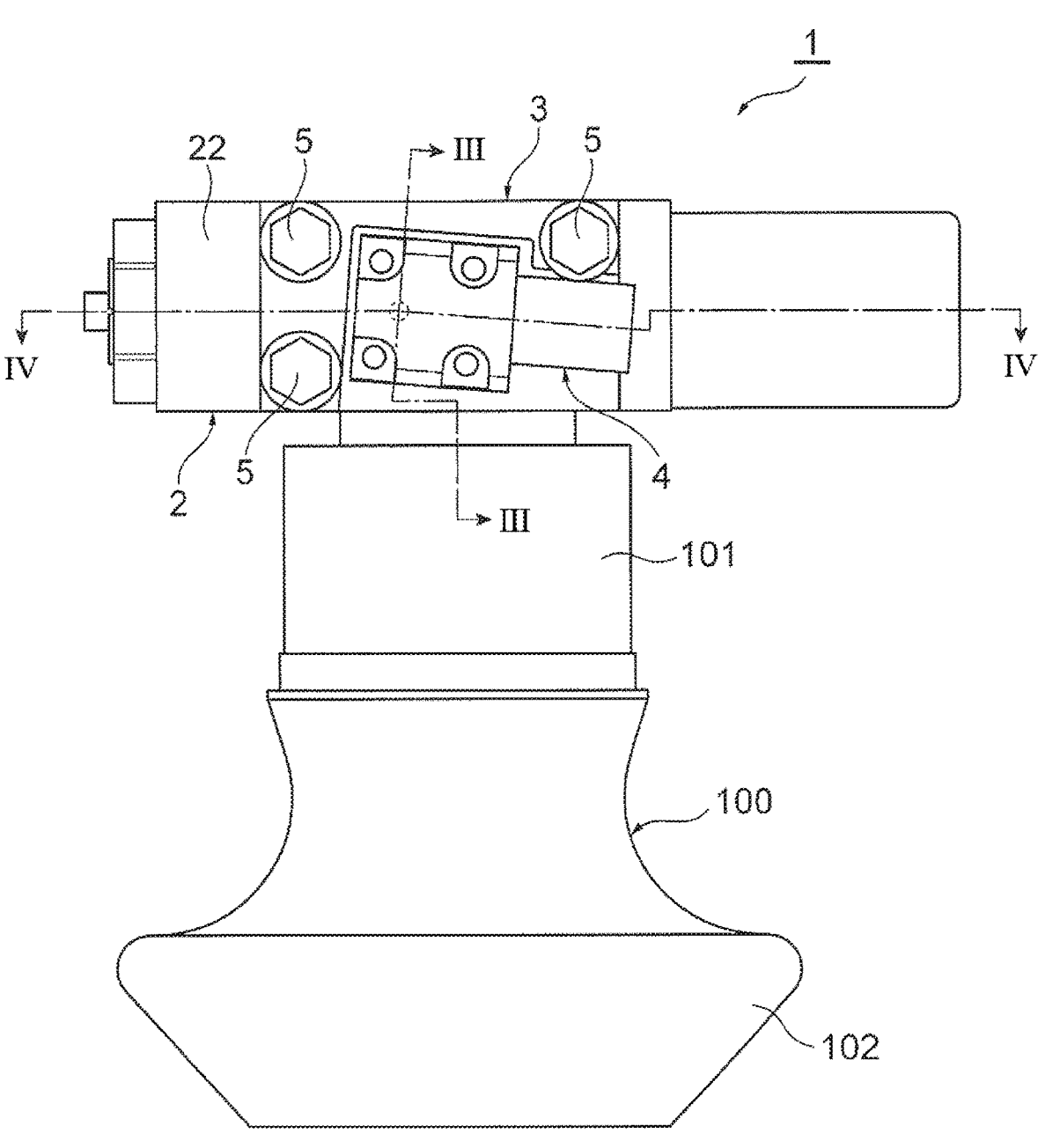
FIG. 2 is a side view illustrating a valve structure of the hydrogen tank according to the embodiment.

FIG. 1 is a perspective view showing a valve structure of a hydrogen tank according to an embodiment, and FIG. 2 is a side view showing a valve structure of a hydrogen tank according to an embodiment.

Figure 3:
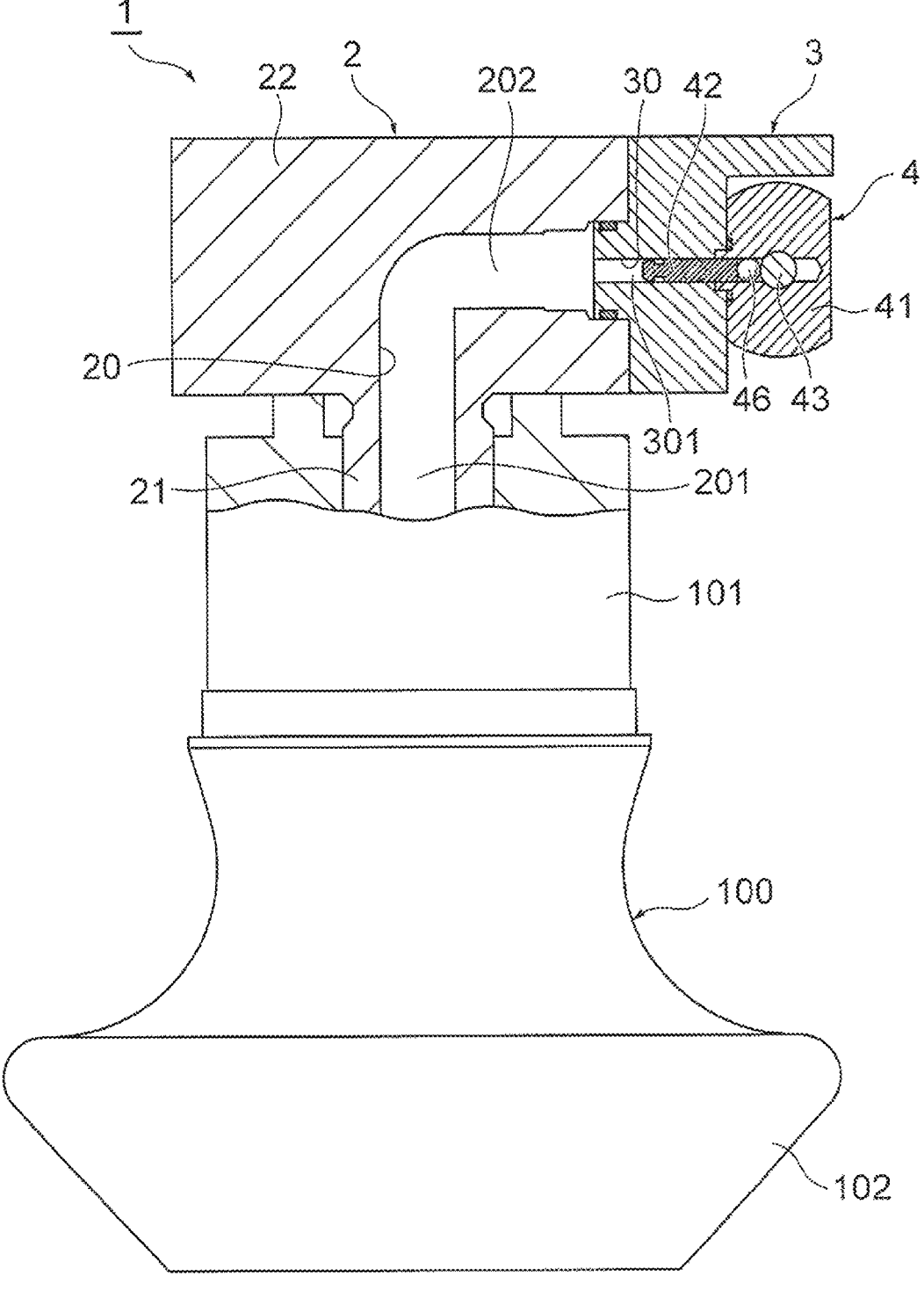
FIG. 3 is a cross-sectional view taken along III-III line of FIG. 2.

FIG. 3 is a cross-sectional view taken along III-III line of FIG. 2, and

Figure 4:
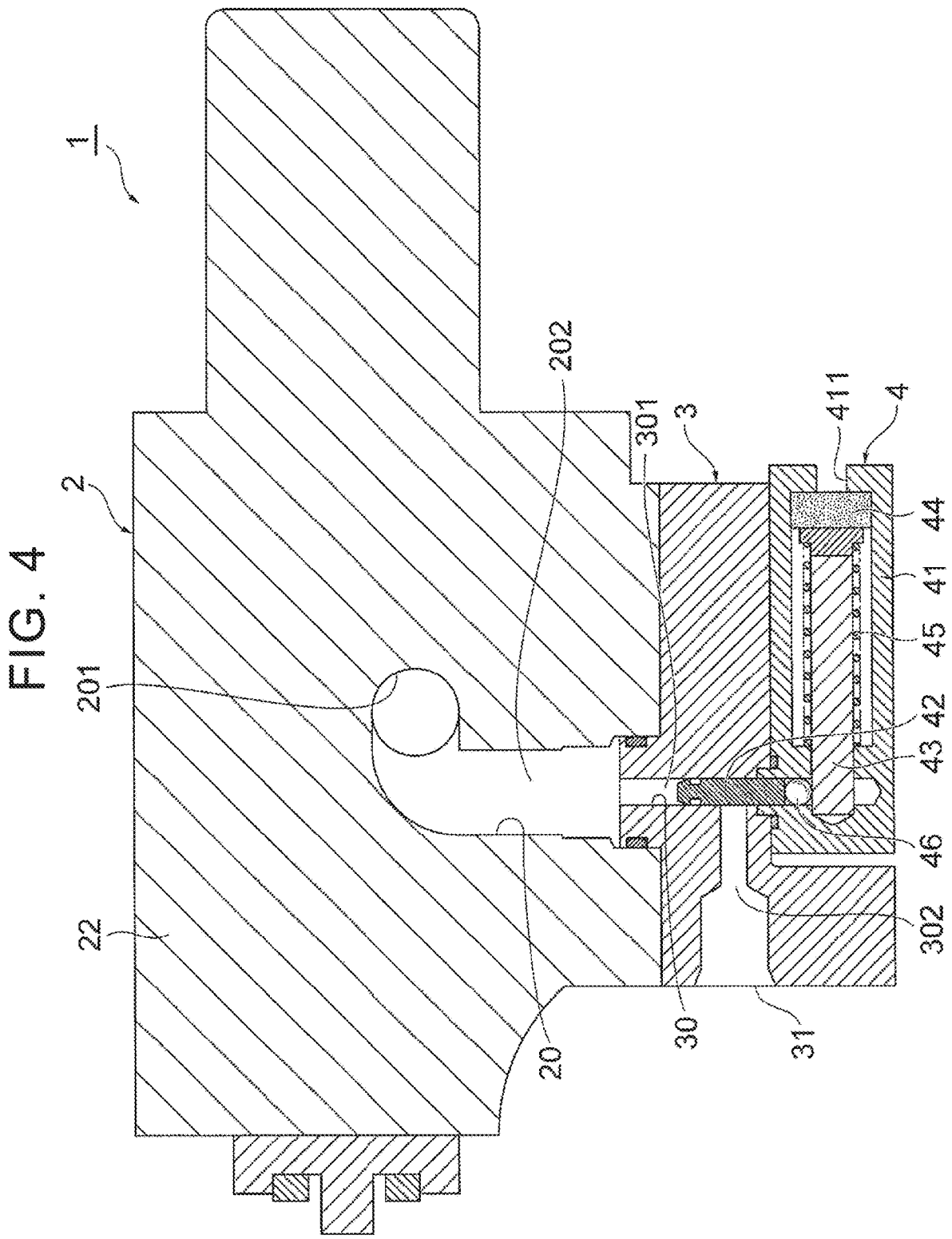
FIG. 4 is a cross-sectional view taken along IV-IV line of FIG. 2.

FIG. 4 is a cross-sectional view taken along IV-IV line of FIG. 2. The valve structure 1 (hereinafter, abbreviated as "valve structure 1") of the hydrogen tank according to the present embodiment is used by being attached to a base 100 of a hydrogen tank (not shown).

Here, the structure of the hydrogen tank will be briefly described. The hydrogen tank is a hollow container that stores high-pressure hydrogen. The hydrogen tank includes, for example, a substantially cylindrical liner having both ends rounded in a dome shape, a fiber-reinforced resin layer (also referred to as a reinforcing layer) formed so as to cover the outer peripheral surface of the liner, and a base 100 attached to one end portion of the hydrogen tank.

The base 100 is formed by processing a metal material such as stainless steel or an aluminum alloy into a predetermined shape. The base 100 has a substantially cylindrical base body portion 101 extending along the axial direction of the hydrogen tank, and a flange portion 102 integrally formed with the base body portion 101 and protruding in the radial direction of the hydrogen tank. The base 100 having such a structure is fixed to the end portion of the hydrogen tank by sandwiching the flange portion 102 between the liner and the reinforcing layer. Further, a female screw portion for screwing with the valve structure 1 is formed on the inner peripheral wall of the base body portion 101.

The valve structure 1 mainly includes a valve body 2 that is attached to the base 100 of the hydrogen tank and has a first communication passage 20 that communicates with the inside of the hydrogen tank, and a fusible plug valve 4 that is attached to the valve body 2 via a spacer 3. The valve body 2 is formed of a metal material such as stainless steel or an aluminum alloy, and has an insertion portion 21 inserted into the inside of the base 100, and a protruding portion 22 integrally formed with the insertion portion 21 and protruding from the base 100.

The insertion portion 21 has a cylindrical shape extending along the axial direction of the hydrogen tank, and a male screw portion that is threadedly engaged with a female screw portion formed on an inner peripheral wall of the base 100 is formed on an outer peripheral wall thereof. The protruding portion 22 has a substantially rectangular shape and extends in the radial direction of the insertion portion 21 (that is, in the radial direction of the hydrogen tank) so as to have a T-shaped cross section with respect to the insertion portion 21.

As illustrated in FIGS. 3 and 4, the first communication passage 20 is provided inside the insertion portion 21 and the protruding portion 22. The first communication passage 20 has an axial portion 201 and a radial portion 202. The axial portion 201 is formed along the axial direction of the insertion portion 21 (that is, the axial direction of the hydrogen tank) over the entire length of the insertion portion 21 and the protruding portion 22. The radial portion 202 communicates with the axial portion 201 and extends in the radial direction of the insertion portion 21 toward the spacer 3.

The spacer 3 is formed in a substantially block shape by a metal material such as stainless steel or an aluminum alloy, and is fixed to the side wall of the protruding portion 22 by a bolt 5. Here, the side wall refers to an outer wall extending along the axial direction of the insertion portion 21. The spacer 3 has a second communication passage 30 communicating with the first communication passage 20, and a discharge port 31 provided on the outer wall of the spacer 3.

As illustrated in FIGS. 3 and 4, the second communication passage 30 includes a first portion 301 and a second portion 302. The first portion 301 communicates with the radial portion 202 of the first communication passage 20 and extends in the radial direction of the insertion portion 21. The second portion 302 extends in a direction orthogonal to the extending direction of the first portion 301 so as to communicate the first portion 301 and the discharge port 31. The first portion 301 is formed so that its diameter is slightly smaller than the diameter of the radial portion 202 of the first communication passage 20, and the second portion 302 is formed so that its diameter increases toward the discharge port 31 (see FIG. 4).

The second communication passage 30 and the discharge port 31 are cut off by the valve body 42 of the fusible plug valve 4 when the valve of the fusible plug valve 4 is closed, and are formed so as to communicate with each other when the valve of the fusible plug valve 4 is opened.

the fusible plug valve 4 is disposed on the opposite side of the valve body 2 with the spacer 3 interposed therebetween, and is fixed to the side wall of the spacer 3 by bolts. the fusible plug valve 4 is a safety valve for opening the valve and discharging the high-pressure hydrogen gas in the hydrogen tank when the predetermined temperature or the predetermined pressure is reached, and is, for example, a thermally actuated safety valve (TPRD, Thermal pressure relief device).

the fusible plug valve 4 includes a valve housing 41, a valve body 42, a pressing member 43, a fusible member 44 arranged in parallel with the pressing member 43, and a coil spring 45. The valve body 42 blocks communication with the second communication passage 30 and the discharge port 31. The pressing member 43 presses the valve body 42 in the valve closing direction. The coil spring 45 biases the pressing member 43 toward the fusible member 44.

The valve body 42 has a substantially circular rod shape and is formed to be movable in the first portion 301 of the second communication passage 30 by the opening and closing operation of the fusible plug valve 4. Specifically, one end of the valve body 42 enters the first portion 301 of the second communication passage 30 and closes the first portion 301, and the other end thereof is in contact with the pressing member 43 via the spherical bearing 46.

The pressing member 43 is formed in a cylindrical shape, and is accommodated in the valve housing 41 so that its axial direction is along the longitudinal direction of the valve housing 41. The coil spring 45 is accommodated in the valve housing 41 in a state of being compressed in the axial direction of the pressing member 43, and biases the pressing member 43 toward the fusible member 44.

The fusible member 44 is formed in a disk shape by a material that melts when the ambient temperature reaches a predetermined temperature, for example, a low-melting-point metal material such as lead or tin. The fusible member 44 is arranged in parallel with the pressing member 43 along the longitudinal direction of the valve housing 41 (that is, the axial direction of the pressing member 43). The fusible member 44 is accommodated in the valve housing 41 so as to close the open end 411 of the valve housing 41 (see FIG. 4).

As shown in FIG. 4, in the valve-closed state of the fusible plug valve 4, the pressing member 43 presses the valve body 42 toward the second communication passage 30 via the bearing 46 that abuts against the valve body. As a result, the valve body 42 is pushed into the first portion 301 of the second communication passage 30. Therefore, the second communication passage 30 and the discharge port 31 are shut off by the valve body 42.

Figure 5:
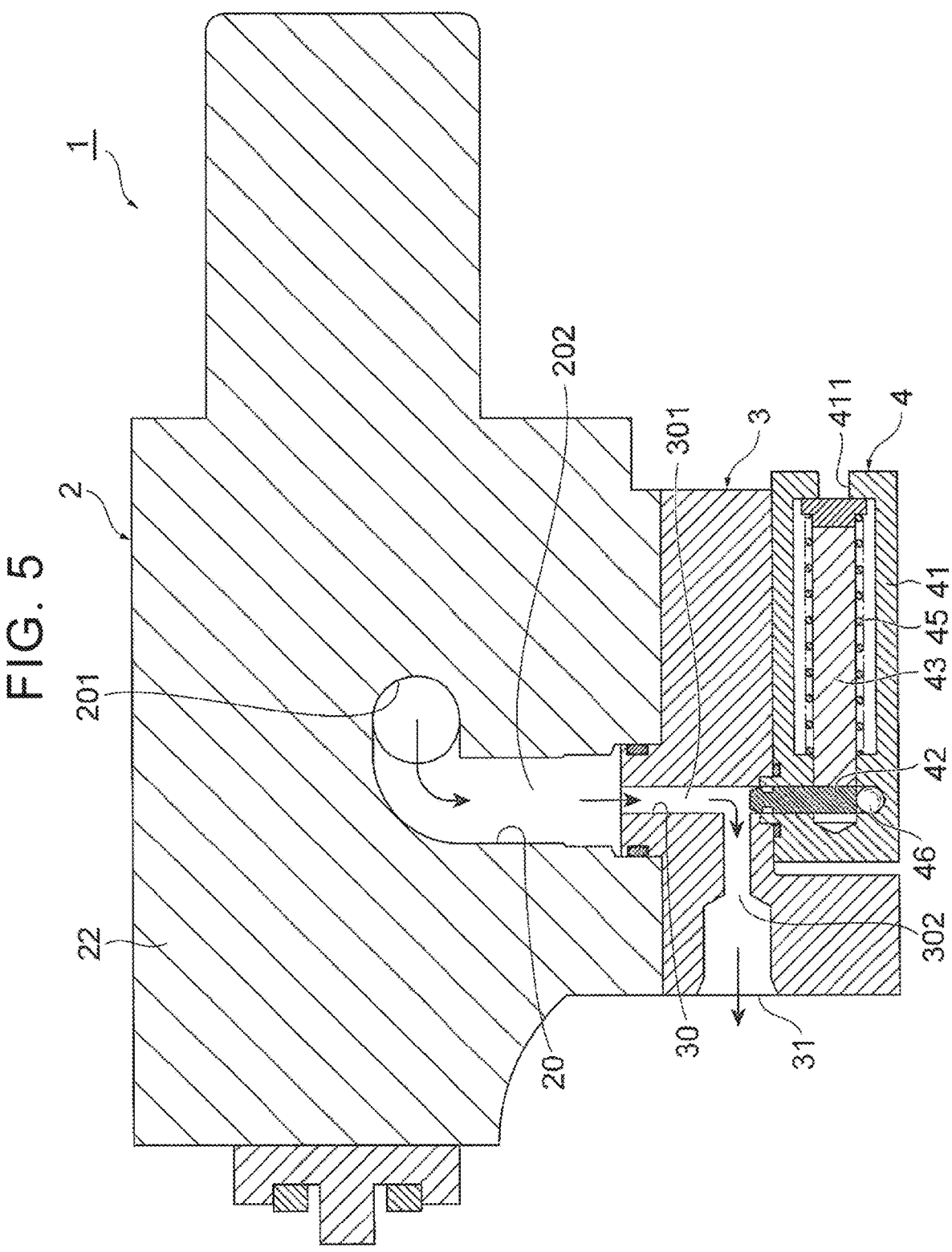
FIG. 5 is a cross-sectional view showing the valve opening of the fusible plug valve.
Figure 6:
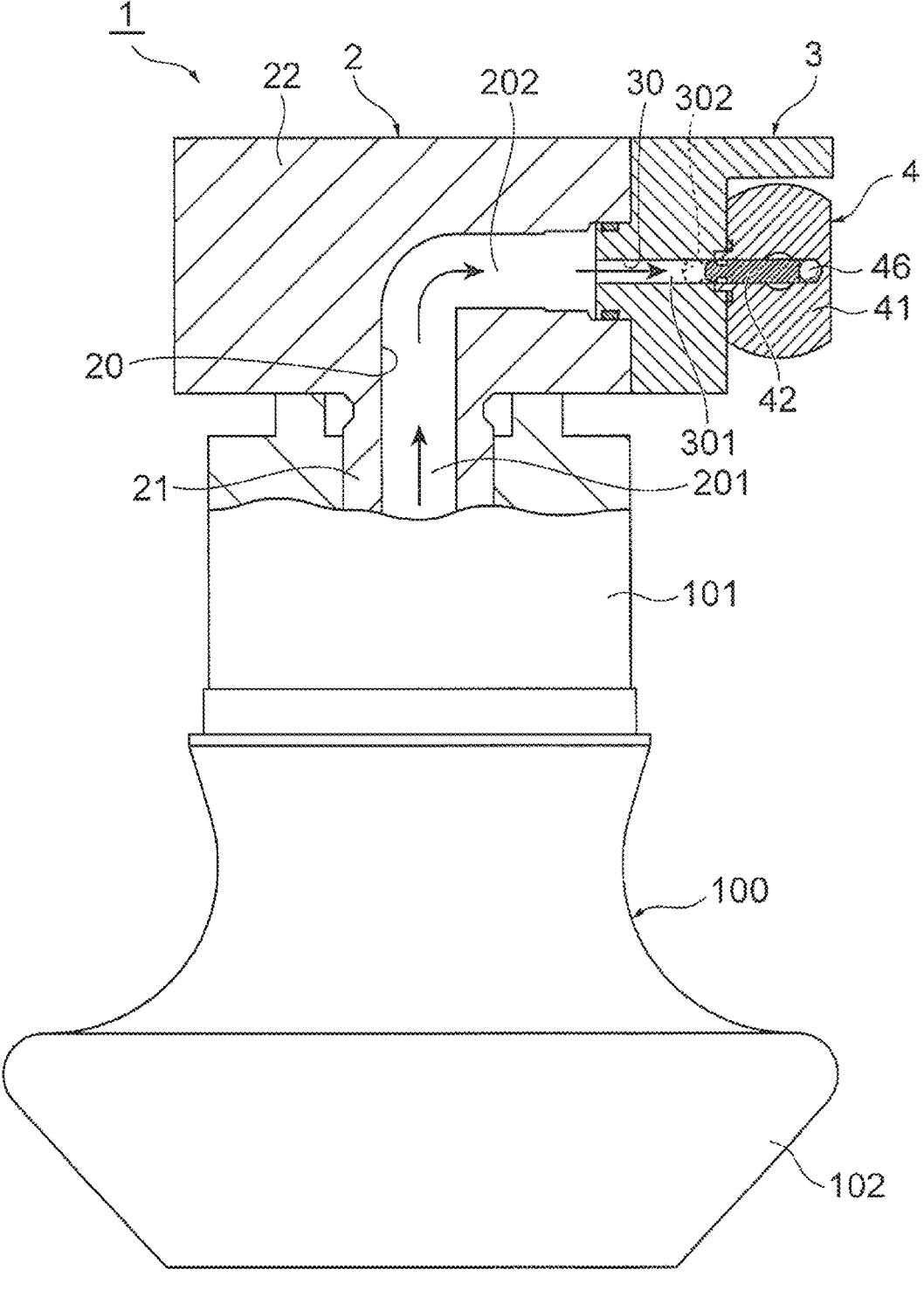
FIG. 6 is a cross-sectional view illustrating a valve opening state of the fusible plug valve.

On the other hand, when the ambient temperature of the fusible plug valve 4 reaches a predetermined temperature, as shown in FIGS. 5 and 6, the fusible member 44 melts, and the open end 411 of the valve housing 41 opens. Accordingly, the pressing member 43 moves to the space in which the fusible member 44 is accommodated by the urging force of the coil spring 45. The valve body 42 is pressed toward the fusible plug valve 4 by the pressure of the high-pressure hydrogen. As a result, the fusible plug valve 4 is opened, and the second communication passage 30 and the discharge port 31 communicate with each other. At this time, the hydrogen gas stored in the hydrogen tank is discharged to the atmosphere via the first communication passage 20, the second communication passage 30, and the discharge port 31 (see arrows in FIGS. 5 and 6).

In the present embodiment, the discharge port 31 is provided on the outer wall of the spacer 3 other than the outer wall that contacts the valve body 2 and the outer wall other than the outer wall that contacts the fusible plug valve 4. For example, in FIG. 1, in a case where the upper and lower sides of the paper surface are in the vertical direction, the left and right sides of the paper surface are in the front-rear direction, and the direction orthogonal to the upper, lower, and left and right sides of the paper surface is in the horizontal direction, the left-side outer wall of the upper, lower, front-rear, and left-right outer walls of the spacer 3 is in contact with the valve body 2, and the right-side outer wall is in contact with the fusible plug valve 4. Therefore, the discharge port 31 can be provided in any of the outer walls excluding the outer walls, that is, the upper outer wall, the lower outer wall, the front outer wall, and the rear outer wall. In this way, the arrangement position of the discharge port 31 can be selected. In other words, the orientation of the discharge port 31 can be adjusted. Therefore, by changing the position of the discharge port 31 according to the arrangement relationship of the peripheral components of the valve structure 1, in particular, the arrangement state of the components around the spacer 3, it is possible to prevent the hydrogen gas to be discharged from interfering with the peripheral components.

Further, when viewed from a direction orthogonal to the direction in which the pressing member 43 and the fusible member 44 are arranged in parallel (that is, the longitudinal direction of the valve housing 41), the discharge port 31 is preferably arranged on the side opposite to the fusible member 44. Specifically, for example, in the case where the left-right direction of the paper surface is the front-rear direction in FIG. 4, the pressing member 43 and the fusible member 44 are arranged side by side along the front-rear direction (that is, the longitudinal direction of the valve housing 41). Since the fusible member 44 is located on the rear side of the pressing member 43, the discharge port 31 is disposed on the front side opposite to the fusible member 44, that is, on the front side outer wall of the spacer 3. By disposing the discharge port 31 on the side opposite to the fusible member 44 in this way, it is possible to suppress the influence of the hydrogen discharge on the fusible plug valve 4.

In the valve structure 1 configured as described above, since the fusible plug valve 4 is attached to the valve body 2 via the spacer 3, the structure is simplified as compared with a conventional structure having a hydrogen pipe. Further, the fusible plug valve 4 is not directly attached to the valve body 2, but is attached to the valve body 2 via the spacer 3. Therefore, the discharge port 31 for the hydrogen gas can be provided in the spacer 3 without being provided in the valve body 2, and the number of locations where the discharge port 31 can be disposed increases.

In addition, the discharge port 31 is provided on an outer wall of the outer wall of the spacer 3 other than the outer wall in contact with the valve body 2 and the outer wall other than the outer wall in contact with the fusible plug valve 4. Therefore, the position of the discharge port 31 can be arbitrarily adjusted as long as it is the outer wall of the spacer 3 other than the outer wall in contact with the valve body 2 and the outer wall other than the outer wall in contact with the fusible plug valve 4. Therefore, the position of the discharge port 31 can be changed so as not to interfere with the peripheral component according to the arrangement relationship of the peripheral component of the valve structure 1. As a result, it is possible to realize the valve structure of the hydrogen tank capable of changing the position of the discharge port 31 while suppressing the complication of the structure.

Although the embodiment of the disclosure has been described in detail above, the disclosure is not limited to the embodiment described above, and various design changes can be made without departing from the spirit of the disclosure described in the claims.

What is claimed is:

1. A valve structure for a hydrogen tank, comprising:
   a valve body mounted to a metal fitting of the hydrogen tank and having a first communication passage communicating with an interior of the hydrogen tank; and
   a fusible plug valve attached to the valve body via a spacer having a block shape, wherein:
   the spacer has a second communication passage communicating with the first communication passage, and a discharge port provided in a first outer wall of the spacer;
   the first outer wall is different from (i) a second outer wall of the spacer that is in contact with the valve body and (ii) a third outer wall of the spacer that is in contact with the fusible plug valve;
   the fusible plug valve includes
      a valve element,
      a pressing member configured to press the valve element in a valve closing direction, the pressing member having an axial direction that is transverse to a movement direction of the valve element between a blocking position and a communicating position of the valve element,
      a valve housing accommodating the pressing member and having an open end, and
      a fusible member disposed at the open end to close the open end;
   in a state where the fusible plug valve is closed, the pressing member presses the valve element to hold the valve element at the blocking position such that the valve element blocks communication between the second communication passage and the discharge port; and in a case where the fusible plug valve is opened in response to melting the fusible member and moving the pressing member toward the open end in the axial direction, the valve element is moved to the communicating position such that the second communication passage communicates with the discharge port.

2. The valve structure according to claim 1, wherein:

the discharge port is disposed on a side opposite to the fusible member when viewed in a direction orthogonal to a direction in which the pressing member and the fusible member are juxtaposed.

3. The valve structure according to claim 1, wherein the second communication passage includes:

a first portion extending in a radial direction of the hydrogen tank to communicate with the first communication passage; and a second portion extending in a direction orthogonal to a direction in which the first portion extends, to communicate the first portion with the discharge port.

4. The valve structure according to claim 3, wherein the second portion has a diameter that increases toward the discharge port.

5. The valve structure according to claim 1, wherein the valve body includes:

an insertion portion inserted into the metal fitting of the hydrogen tank; and a protruding portion integrally formed with the insertion portion and protruding in a radial direction of the hydrogen tank.

* * * * *